United States Patent
Mohanty et al.

(10) Patent No.: US 7,579,413 B2
(45) Date of Patent: Aug. 25, 2009

(54) HYPERBRANCHED POLYMER MODIFIED BIOPOLYMERS, THEIR BIOBASED MATERIALS AND PROCESS FOR THE PREPARATION THEREOF

(75) Inventors: Amar K. Mohanty, Lansing, MI (US); Rahul Bhardwaj, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 488 days.

(21) Appl. No.: 11/414,716

(22) Filed: Apr. 28, 2006

(65) Prior Publication Data

US 2006/0247387 A1 Nov. 2, 2006

Related U.S. Application Data

(60) Provisional application No. 60/676,657, filed on Apr. 29, 2005, provisional application No. 60/774,848, filed on Feb. 17, 2006.

(51) Int. Cl.
*C08G 63/91* (2006.01)
(52) U.S. Cl. .............. 525/415; 525/410; 525/411; 525/437; 525/444; 525/450
(58) Field of Classification Search ........... 525/55, 525/176, 185, 190, 410, 411, 415, 437, 444, 525/450
See application file for complete search history.

(56) References Cited

U.S. PATENT DOCUMENTS

| | | | |
|---|---|---|---|
| 5,418,301 A | 5/1995 | Hult et al. | |
| 5,663,247 A | 9/1997 | Sorensen et al. | |
| 6,093,777 A * | 7/2000 | Sorensen et al. | 525/438 |
| 6,583,232 B1 * | 6/2003 | Brown | 525/410 |
| 6,706,942 B1 * | 3/2004 | Zhao et al. | 604/364 |
| 6,808,795 B2 * | 10/2004 | Noda et al. | 428/221 |
| 7,297,394 B2 * | 11/2007 | Khemani et al. | 428/220 |
| 2005/0240000 A1 | 10/2005 | Haggman et al. | |

OTHER PUBLICATIONS

McCarthy, Stephen, et al, "Biodegradable Plasticizers for Polylactic Acid," ANTEC 2001 Plastics: The Lone Star, vol. 3: Special Areas, Society of Plastics Engineers. p. 794.*
Zhang et al, Mechanical Properties and crystallization behavior of polylactic acid blended wth dendritic hyperbranched polymer, Apr. 15, 2004, Polymer International, 53:716-722.*
Hocking, P.J., et al., "Chemistry and Technology of Biodegradable Polymers", 1st edition, Ed. Griffin, G.J.L., Chapman and Hall, Glasgow, p. 48.2 (1994).
Fei, B., et al., Polymer, 45, 6275-6284 (2004)).
Anderson, K.S.., Lim, S.H., Hillmyer, M.A., "Toughening of Polylactide by Melt Blending with Linear Low-Density Polyethylene", Journal of Applied Polymer Science, 89, 3757-3768 (2003)).

(Continued)

*Primary Examiner*—Randy Gulakowski
*Assistant Examiner*—Rachel Kahn
(74) *Attorney, Agent, or Firm*—Ian C. McLeod

(57) ABSTRACT

Compositions of biodegradable polymers and hyperbranched dendritic polymer (HBP) are described. The compositions can also include anhydride modified HBP. The resulting compositions have superior elongation at break and can be as cast or blown films for packaging, for example.

25 Claims, 10 Drawing Sheets

Reaction mechanism of hyperbranched polymer (HBP) with polyanhydride (PA). The OH group of HBP can react with anhydride group of PA to form ester linkage.

OTHER PUBLICATIONS

Labrecque et al., "Citrate Esters as Plasticizers for Poly (lactic acid).", Journal of Applied Polymer Science, 66(8), 1507-1513, (1997).

Martin et al. "Poly (lactic acid): Plasticization and properties of biodegradable multiphase systems.", Polymer, 42, 6209-6219, (2001).

Jacobsen et al., "Filling of poly (lactic acid) with native starch.", 36 (22), Polymer Engineering and Science. 2799-2804, (1996).

Jabobsen et al., "Plasticizing Polylactides- the effect of different plasticizers on the mechanical properties.", Polymer Engineering and Science, 39(7), 1303-1310 (1999).

Baltieri et al. "Study of the influence of plasticizers on the thermal and mechanical properties of poly(3-hydroxybutyrate) compounds" Macromol. Symp.,197, 33-44, (2003).

Parulekar et al., "Biodegradable Toughened Polymers from Renewable Resources: Blends of Polyhydroxy-butyrate with Epoxidized Natural Rubber and Maleated Polybutadiene", Green Chemistry, 8(2), 206-213, (2006).

Qiu et al., "Poly(hydroxybutyrate)/poly(butylene succinate) blends: miscibiity and nonisothermal crystallization", Polymer, 44(8), 2503-2508, 2003).

Broz, et al., "Structure and mechanical properties of poly(d,l-lactic acid)/poly (e-caprolactone) blends", Biomaterials, 24, 4181-4190, (2003).

M. Seiler, "Dendritic Polymers-Interdisciplinary Research and Emerging Applications form Unique Structural Properties", Chem. Eng. Technol., 25,3, (2002).

Wong, S., et al., Macromolecular Material and Engineering, 289, 447-456 (2004).

Shuai, et al., "Miscibility of block copolymers of poly(E-caprolactone) and Poly(ethylene glycol) with poly(3-hydroxybutyrate) as well as the compatibilizing effect of thesecopolymers in blends of poly(E-caprolactone) and poly(3-hydroxybutyrate)" Journal of Applied Polymer Science, 80(13), 2600-2608,2001).

* cited by examiner

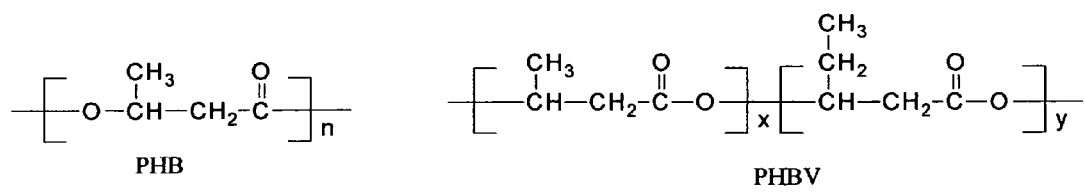
Figure 1: Chemical structure of PHB and PHBV

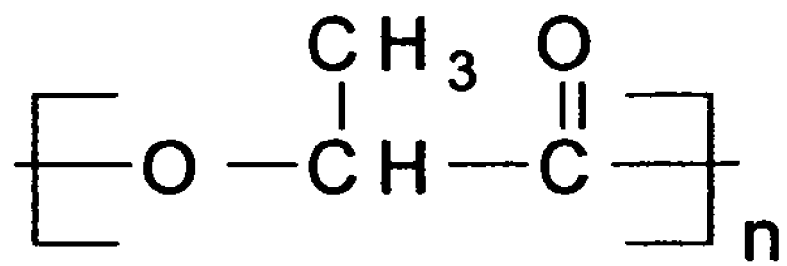
Figure 2: Chemical structure of PLA. The PLA used in this invention was poly(L-lactic acid) (PLLA)

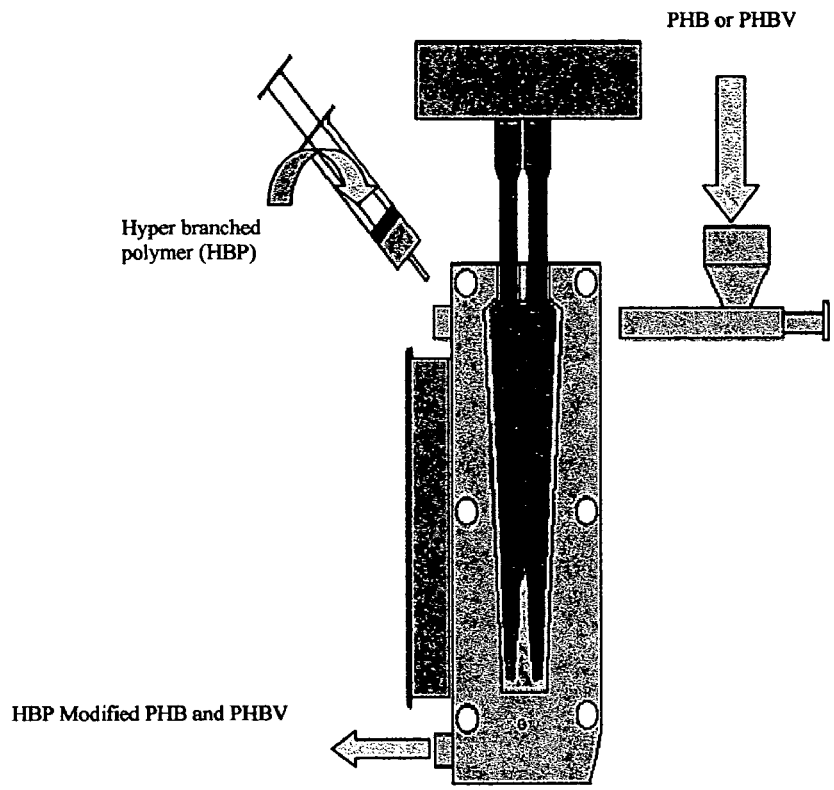
Figure 3: The crossectional view of co-rotating twin screw mini-extruder used for blending PHB and PHBV with HBP.

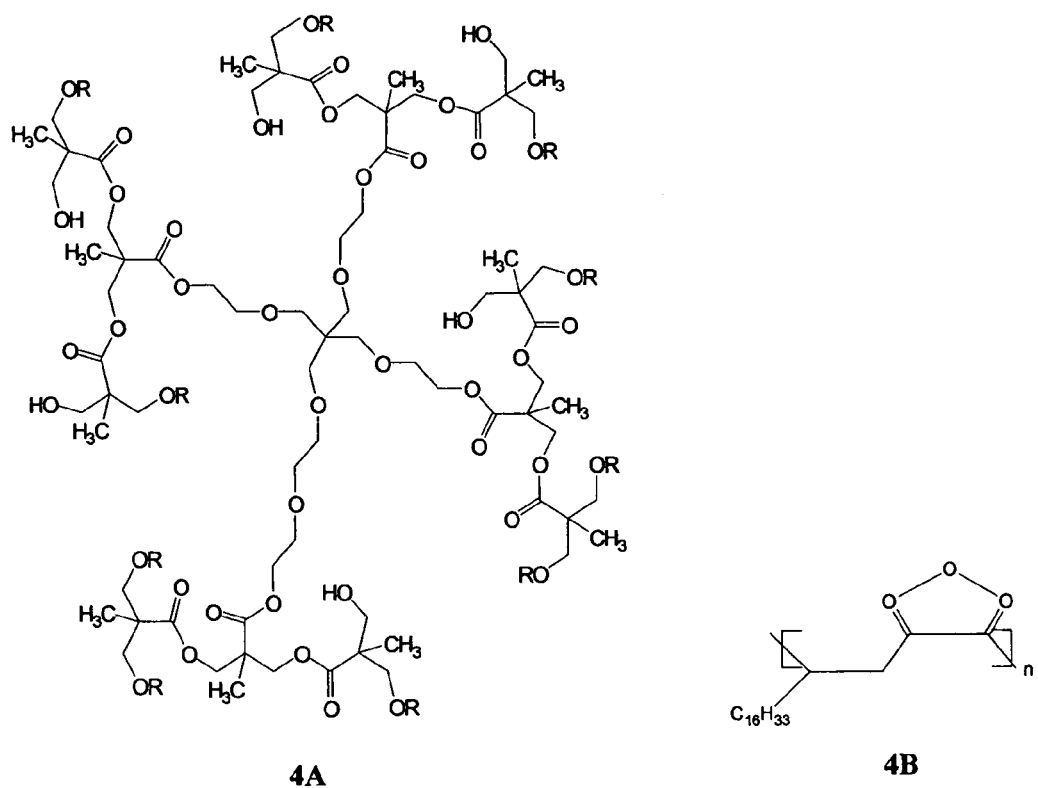
Figure 4: 4 A: Chemical structure of hyperbranched polymer (HBP) used during this invention. Here R: $CO(CH_2)_nCH_3$ (n= 4-10), 4 B: Chemical structure of polyanhydride.

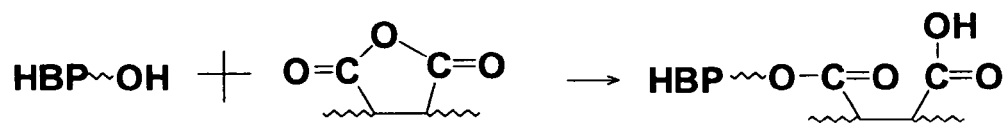
Figure 5: Reaction mechanism of hyperbranched polymer (HBP) with polyanhydride (PA). The OH group of HBP can react with anhydride group of PA to form ester linkage.

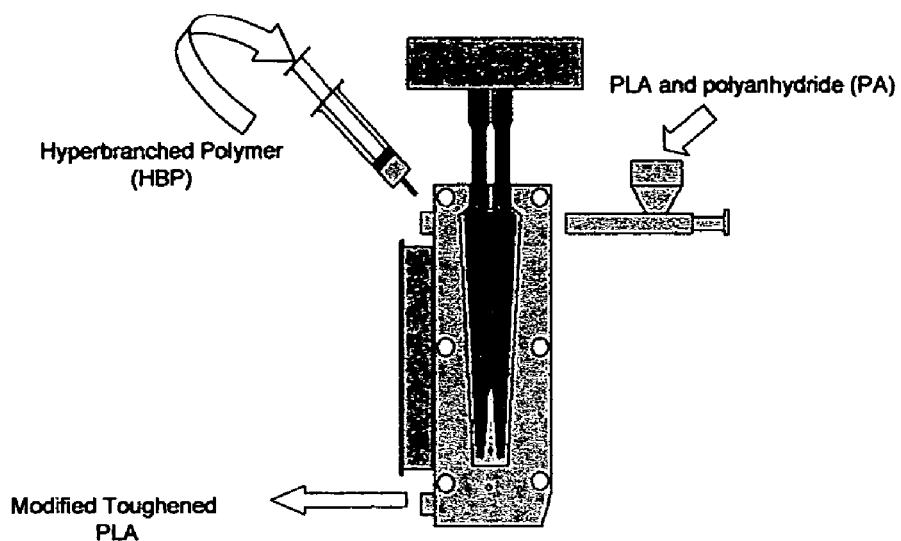
Figure 6: Crossection view of microcompounder used for blending of PLA with in-situ modified HBP.

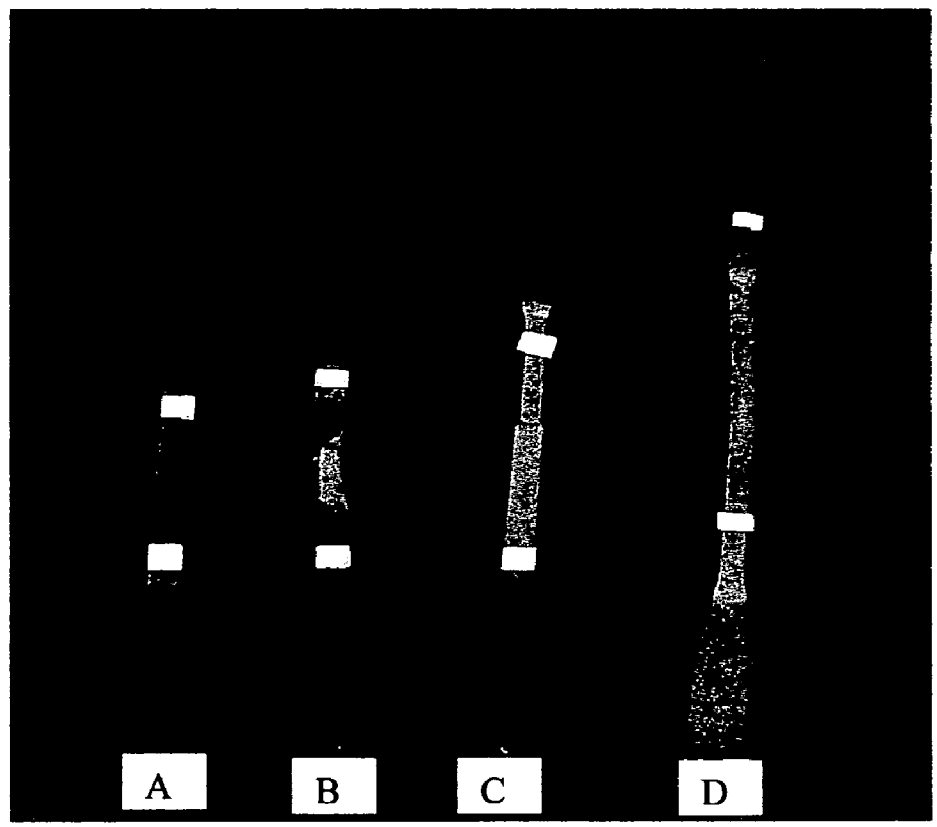
Figure 7: Tensile fractured samples: A: Neat PLA, B: PLA/mHBP(92/08), C: PLA(8%mHBP)98%/clay 2%, D: PLA(8%mHBP)95%/Talc 5%

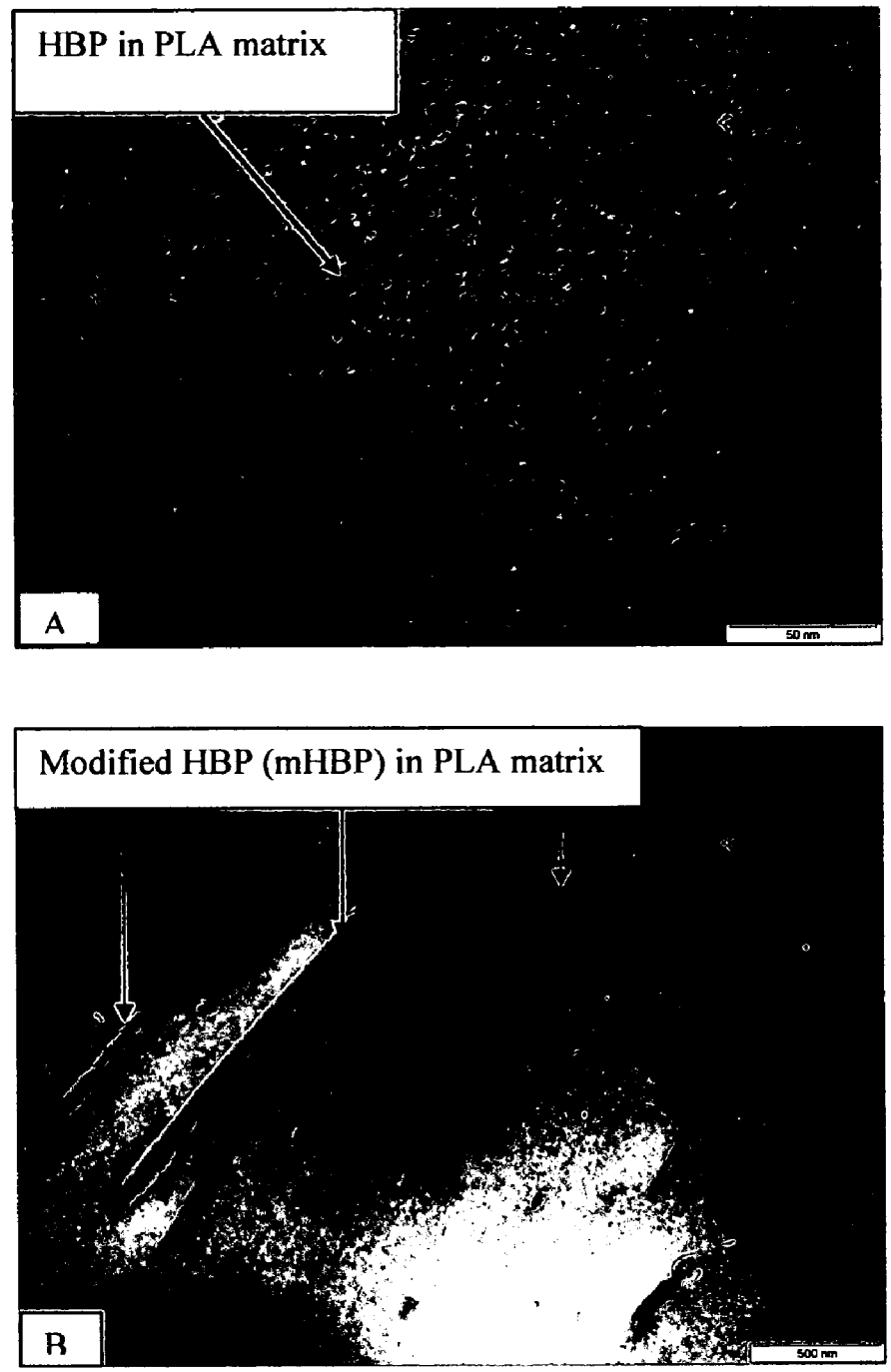
Figure 8: TEM photomicrograph; A: PLA/HBP (90/10); B: PLA/mHBP (90/10)

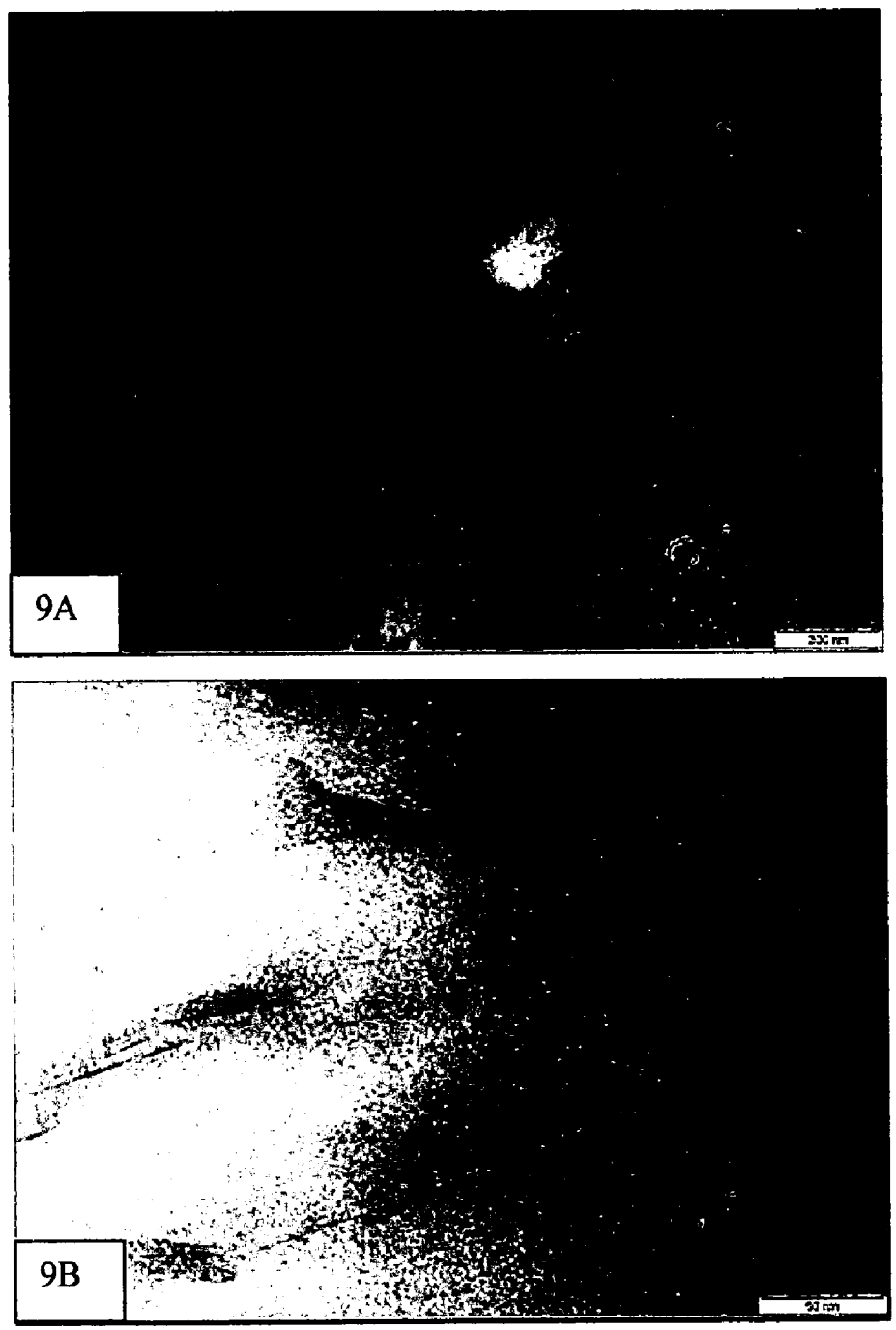
Figure 9: TEM Photomicrographs of 9A: PLA/mHBP(92/8); 9B: PLA(mHBP8%)92%/ Clay 2%

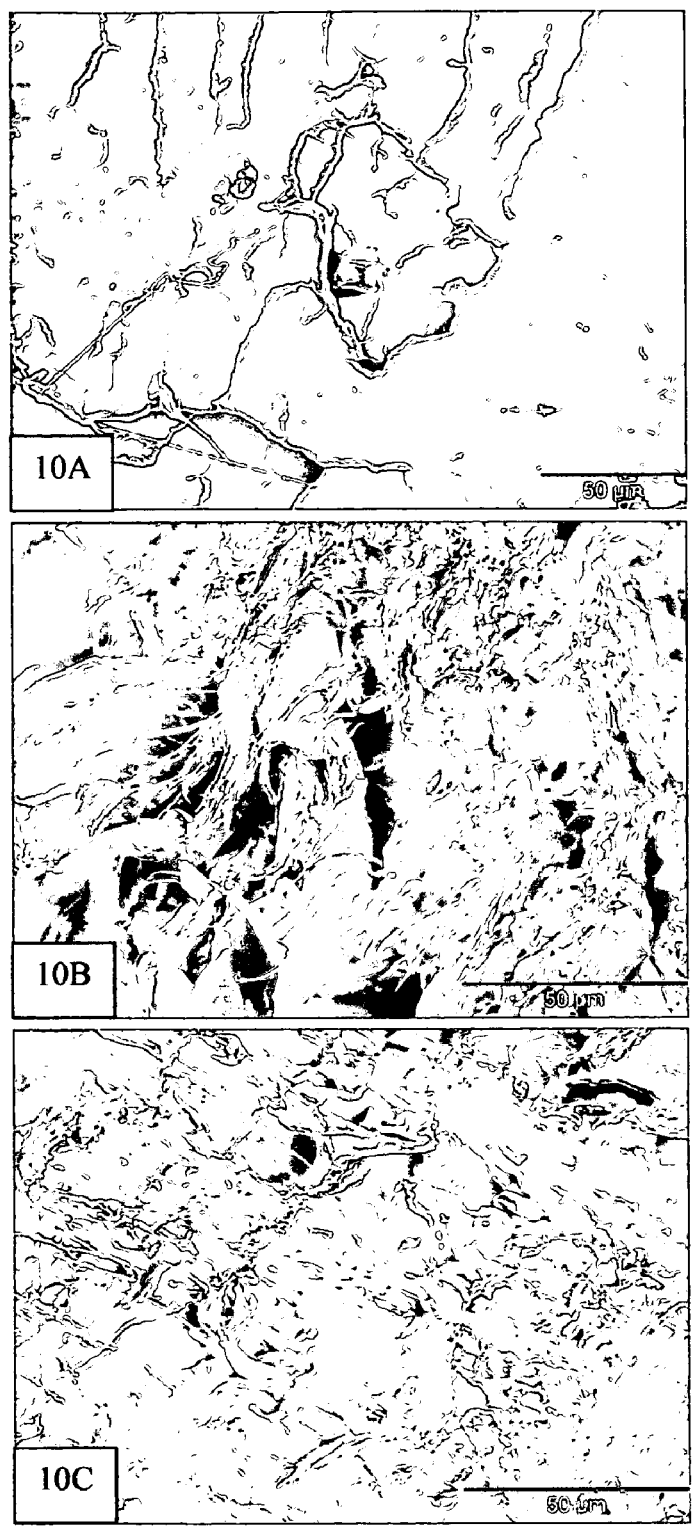
Figure 10: SEM Photomicrographs of 10A: Neat PLA; 10B: PLA/mHBP(92/8); 10C: PLA(mHBP8%)95%/ Talc 5%

US 7,579,413 B2

HYPERBRANCHED POLYMER MODIFIED BIOPOLYMERS, THEIR BIOBASED MATERIALS AND PROCESS FOR THE PREPARATION THEREOF

CROSS-REFERENCE TO RELATED APPLICATIONS

This application claims priority to U.S. Provisional Application Ser. No. 60/676,657, filed Apr. 29, 2005, which is incorporated herein, and U.S. Provisional Application Ser. No. 60/774,848, filed Feb. 17, 2006.

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

The present invention relates to compositions and a method using extrusion blending which incorporates a hyperbranched polymer (HBP) and an in-situ anhydride modified hyperbranched polymer (HBP) into a biodegradable polymer in an amount, which significantly increases the impact strength and percent elongation without an unacceptable decrease in tensile strength and modulus of the biodegradable polymer. The biodegradable polymers are preferably a polyhydroxyalkanoate (PHA) polyester or a polylactic acid (PLA) polyester. The compositions can incorporate fillers.

(2) Description of the Related Art

Biodegradable polymers are moving in to the mainstream due to the nondegradable nature of conventional polymers and their exhausting petroleum sources. The polyhydroxyalkanoates (PHAs) polymers are biodegradable polyester polymer of a 3-hydroxyalkanoic acid containing 3 to 14 carbon monomers. Typically the commercial PHA's are polyhydroxybutyrate (PHB) and/or polyhydroxybutyrate-valerate (PHBV), which are derived from bacterial fermentations. The monomers and polymers can also be produced chemically. Polylactic acid (PLA) is polyester based upon lactic acid, which is a three-carbon monomer. Both PHA and PLA are linear polymers, which are chemically related to each other but the polymers have different physical properties.

Polyhydroxyalkanoates (PHAs) are the biodegradable polyesters commercially produced by several bacteria as intercellular carbon and energy storage materials in their cell (Hocking, P. J., et al., "Chemistry and Technology of Biodegradable Polymers", 1st edition, Ed. Griffin, G. J. L., Chapman and Hall, Glasgow, p. 48.2. (1994)). PHAs have attracted lot of attention due to their environmentally friendly nature and biodegradability. Polyhydroxybutyrate (PHB) and poly (3-hydroxybutyrate-co-3-hydroxyvalerate), PHBV (FIG. 1) are the two most common types of PHA. PHB is a homopolymer having steroregular structure with high crystallinity. Its inherent brittleness and thermal instability impedes its commercial application (deKoning G. J. M., and Lemstra, P. J., Polymer, 34, 4089 (1993)). PHBV is a copolymer in which 3-hydroxyvalerate (HV) units are incorporated in the PHB backbone during the fermentation process. PHBV has improved flexibility and toughness over PHB. Presently, PHBV having a HV content below 15 mol % are commercially available, while large-scale production of PHBV having higher HV content is presently not commercially viable due to the surprisingly high production cost (Fei, B., et al., Polymer, 45, 6275-6284 (2004)). The available PHBV (having a HV content of less than 15 mol %) have a low toughness and elongation at break.

In general, these natural PHA polymers have similar properties to that of polypropylene (PP). They have potential to replace polypropylene and other conventional petroleum based polymers if the PHB and PHBV based materials can be developed with a balance of properties such as stiffness and toughness. Poly(lactic acid) (PLA) is a linear aliphatic polyester (FIG. 2). PLA is gaining a lot of interest due to its biodegradability, biocompatibility and renewable resource based origin. Polylactide can be prepared through the ring-opening polymerization of lactide, of which there are two commonly used isomers (L-lactide and D-lactide)(Anderson, K. S., Lim, S. H., Hillmyer, M. A., "Toughening of Polylactide by Melt Blending with Linear Low-Density Polyethylene", Journal of Applied Polymer Science, 89, 3757-3768 (2003). The major drawbacks of PLA are its low elongation at break, impact strength, heat deflection temperature and low melt strength. One way to overcome the brittleness of PLA is through plasticization. The numbers of plasticizers have been used with appreciable success. The plasticizers reported in literature (Labrecque et. al "Citrate Esters as Plasticizers for Poly (lactic acid).", Journal of Applied Polymer Science, 66(8),1507-1513, (1997),Martin et. al "Poly (lactic acid): Plasticization and properties of biodegradable multiphase systems.", Polymer, 42, 6209-6219, (2001), Jacobsen et. al, "Filling of poly (lactic acid) with native starch.", 36 (22), Polymer Engineering and Science. 2799-2804, (1996), Jacobsen et. al, "Plasticizing Polylactides—the effect of different plasticizers on the mechanical properties.", Polymer Engineering and Science, 39(7), 1303-1310 (1999)) are citrate esters, 1,2-propylene glycol, glycerol, poly-(ethylene glycol), glucose monoesters, and fatty acids. But the major drawback of these plasticizers is their low thermal stability. In long-term use, the plasticizers have problems of leaching out, which result in embrittlement of PLA. In order to get film grade PLA sometimes 20 to 30 wt. % of plasticizers may be needed to achieve the desired flexibility. The leaching of plasticizers also leads to problems of migration. The migration of plasticizers is a critical problem when considering the application of plasticized PLA in food packaging.

Plasticization of polyhydroxyalkanoates especially PHB is done to overcome its brittleness. The common plasticizers reported in literature (Baltieri et. al. "Study of the influence of plasticizers on the thermal and mechanical properties of poly (3-hydroxybutyrate) compounds" Macromol. Symp.,197, 33-44, 2003) are dioctyl phthalate(DOP), dioctyl adipate (DOA),triacytyl glycerol (TAG),and poly adipate(PA). These plasticizers did not improve the flexibility of PHB remarkably. They also lower the properties of polymers such as modulus, strength and gas barrier.

PHB is blended with rubber to improve its toughness( Parulekar et. al "Biodegradable Toughened Polymers from Renewable Resources: Blends of Polyhydroxybutyrate with Epoxidized Natural Rubber and Maleated Polybutadiene", Green Chemistry,8(2), 206-213, (2006). But these blends have drastically low modulus and strength. To improve compatibility between rubber and PHB additional compatibilizers are required.

PHB is also blended with other high impact biodegradable polymers such as polycaprolactone (PCL) (Shuai et. al. "Miscibility of block copolymers of poly(ε-caprolactone) and poly (ethylene glycol) with poly(3-hydroxybutyrate) as well as the compatibilizing effect of these copolymers in blends of poly (ε-caprolactone) and poly(3-hydroxybutyrate)", Journal of Applied Polymer Science,80 (13), 2600-2608, 2001), and polybutylenesuccinate (PBS) (Qiu et. al. "Poly(hydroxybutyrate)/poly(butylene succinate) blends: miscibility and nonisothermal crystallization", Polymer, 44(8), 2503-2508, 2003). But incompatibility between two different polymers is a big problem. We also have to add such petroleum based biodegradable polymers in large quantity, which reduced the wt. fraction of renewable/biobased PHB in the overall blend composition.

PLA is blended with rubber to improve its toughness (Jin et. al. "Blending of poly(L-lactic acid) with poly(cis-1,4-isoprene)", European Polymer Journal, 36(1), 165-169, 2000).But the incompatibility between two polymer phases is a major drawback.

PLA is also blended with other high impact biodegradable polymers such as polycaprolactone (PCL) (Broz et. al., "Structure and mechanical properties of poly(d,l-lactic acid)/poly(ε-caprolactone) blends", Biomaterials, 24, 4181-4190, (2003). But incompatibility between two polymer phase is again a major problem.

Hyperbranched polymers are relatively new materials in the field of polymers. Their uniqueness lies in their cavernous interior and nano-scale dimensions (M. Seiler, "Dendritic Polymers-Interdisciplinary Research and Emerging Applications from Unique Structural Properties", Chem. Eng. Technol., 25,3, (2002)). Researchers in Australia are able to improve the fracture toughness of natural fiber reinforced PLA composites modified with hyperbranched polymers (Wong, S., et al., Macromolecular Material and Engineering, 289, 447-456 (2004)). They have used solvent casting methods to treat PLA with hyperbranched polymers. Hyperbranched polymer is hydroxyl functional aliphatic polyester, having a tree like macromolecule structure in which a polyalcohol is a core from which other multifunctional compounds as repeating units extends. This forms a core-shell structure having large number of hydroxyl group at the periphery (Hyperbranched polymers-Unique design tools for multi property control in resins and coatings, Bo Pettersson, Perstorp Polyols, http://perstorp.com/upload/hyperbranched_polymers.pdf).

U.S. Pat. Nos. 5,418,301 and 5,663,247, and published Application U.S. 2005/0240000 A1 describe hyperbranched polyester polymers. These patents and application are incorporated herein in their entireties. They are not disclosed to be useful with the PHA and PLA polymers. FIGS. 1 and 2 show the PHA and PLA polymers.

The following references are illustrative of the prior art in polylactic acid.

1. Anderson, K. S., Lim, S. H., Hillmyer, M. A., "Toughening of Polylactide by Melt Blending with Linear Low-Density Polyethylene", Journal of Applied Polymer Science, 89, 3757-3768 (2003).

2. Labrecque, L. V., Kumar, R. A., Dave, V., Gross, R. A., McCarthy, S. P." Citrate Esters as Plasticizers for Poly (lactic acid).", Journal of Applied Polymer Science,66 (8), 1507-1513 (1997).

3. Martin, O., Averous, L., "Poly (lactic acid): Plasticization and properties of biodegradable multiphase systems.", Polymer, 42, 6209-6219 (2001).

4. Jacobsen, S., Fritz, H. G., "Filling of poly (lactic acid) with native starch.", Polymer Engineering and Science, 36 (22), 2799-2804 (1996).

5. Jacobsen, S., Fritz, H. G., "Plasticizing polylactides—the effect of different plasticizers on the mechanical properties.", Polymer Engineering and Science, 39(7), 1303-1310 (1999).

BRIEF DESCRIPTION OF THE DRAWINGS

FIG. 1 shows the chemical structure of PHB and PHBV.

FIG. 2 shows the chemical structure of PLA.

FIG. 3 shows the crossectional view of microcompounding extruder used for blending of PHA and PHBV with HBP.

FIG. 4A shows the chemical structure of hyperbranched polymer (HBP) used in the present invention. Here R: $CO(CH_2)_nCH_3$ (n=4-10).

FIG. 4B shows chemical structure of polyanhydride (PA) used in this invention.

FIG. 5 shows the reaction mechanism of HBP with PA. The hydroxyl group (—OH) of HBP can reacts with anhydride group of polyanhydride to form an ester linkage.

FIG. 6 shows the cross-section view of Microcompounding extruder apparatus used for blending of PLA with modified HBP.

FIG. 7 shows the digital photograph of tensile fractured samples of neat PLA, modified PLA, modified PLA based nanocomposite and modified PLA based talc filled composite.

FIG. 8 shows the transmission electron microscope (TEM) images of PLA based compositions. The TEM pictures were taken after staining the micotommed samples with Ruthenium Tetroxide ($RuO_4$). The hyperbranched polymer is known to take up the stain and appear as dark patches in TEM images.

FIG. 8A represents the TEM photomicrographs of the PLA/HBP (90 wt %/10 wt %) blends. The average diameter of HBP was ~4 nm.

FIG. 8B shows the dimensions and dispersion of modified/sparsely crosslinked HBP particles in PLA matrix. The dimensions of the most of modified HBP particles were at nanometer scale. These TEM photographs signify the nanoscale modification of PLA opted under this invention.

FIGS. 9A and 9B represent the TEM photomicrographs of PLA modified with 8 wt % anhydride modified HBP (detail in Example 2 under polylactic acid) and its nanocomposite having 2 wt % organo-clay. The TEM of nanocomposite (FIG. 9B) revealed exfoliated clay-platelets in the PLA matrix. This result showed the importance of HBP in the dispersion of clay platelets.

FIGS. 10A, 10B and 10C represent the SEM photomicrographs of tensile fractured samples of neat PLA, PLA/mHBP (92%/8%) and PLA(mHBP8%) 95%/Talc 5%, respectively. There was clear transition in the surface roughness of PLA when modified with HBP and talc. The SEM photographs revealed ductile failure for modified PLA (FIGS. 10B and 10C) as compared to neat PLA (FIG. 10A).

OBJECTS

It is an object of the present invention to provide novel compositions with improved impact strength and elongation at break of PHB, PHBV and PLA without an unacceptable decrease in tensile strength and modulus. It is further an object to provide a process for forming the compositions, which is reliable and economically viable. These and other objects will become increasingly apparent by reference to the following description.

SUMMARY OF THE INVENTION

The present invention relates to a composition comprising in an extrusion blended mixture:

(a) a biodegradable polyester polymer of a hydroxyl acid monomer, which have carbon atoms between 3 to 14;

(b) a hyperbranched dendritic polymer; and (c) Optionally an organo clay or talc or natural fiber or their mixtures, wherein the hyperbranched polymer is present in an amount which improves elongation properties of the composition at least about 50% compared to the same properties of the unmodified biodegradable polymer alone. Preferably the biodegradable polymer is a polyhydroxyalkanoate. Preferably the biodegradable polyester polymer is a polylactic acid. Preferably the hyperbranched dendritic polymer is present in an amount between about 2 and 12% by weight of the composition. Preferably the hyperbranched dendritic polymer is a hyperbranched polyester polymer. Preferably the biodegradable polyester polymer is a polyhydroxyalkanoate (PHA) selected from the group consisting of poly (hydroxybutyrate) (PHB), poly (hydroxybutyrate-co-valerate) (PHBV) and mixtures thereof.

The present invention also relates to a composition comprising an extrusion blended mixture:

(a) a biodegradable polyester polymer (polylactic acid) of a lactic acid containing 3 carbon monomers.

(b) a hyperbranched dendritic polymer; and (c) an anhydride

Wherein the anhydride and the hyperbranched polymer improve elongation at break of poly (lactic acid), PLA at least about ~700% without a plasticizer. Preferably the biodegradable polyester polymer is a polylactic acid. Preferably the anhydride modified hyperbranched dendritic polymer is present in an amount between about 2 and 12% by weight of the composition. Preferably the hyperbranched dendritic polymer is a hyperbranched polyester polymer. Preferably the anhydride is a polyanhydride. Preferably the biodegradable polyester polymer is a polyhydroxyalkanoate (PHA) selected from the group consisting of poly (hydroxybutyrate) (PHB), poly (hydroxybutyrate-co-valerate) (PHBV) and mixtures thereof. Preferably the composition comprises a nanoscale clay and micro-scale talc particles. Preferably the composition comprises a natural fiber. Preferably the process for preparing the composition comprises reactively extruding the hyperbranched dendritic polymer with the biodegradable polyester polymer at an extruder barrel temperature of between about 160 and 185° C. and a cycle time between about 2.5 and 10 minutes and wherein the extruder has dual rotating screws for the extruding.

Thus hyperbranched polymers, especially hyperbranched polyester (HBP), are used as impact modifiers for PHB and PHBV as well as PLA. The HBP are characterized as "dendritic" polymers.

The advantages of the invention are:

1. HBP are aliphatic in nature and have low molecular weight. The HBP modified PHB, PHBV and PLA can be biodegradable.
2. HBP are highly reactive and effective even at low concentration.
3. HBP have brought significant improvement in both impact strength and % elongation of PHB and PHBV even at low wt % of hyperbranched (HBP).
4. The HBP do not unacceptably decrease the tensile strength, modulus and HDT of modified PHB and PHBV.

Hyperbranched polymer modified PHB, PHBV and PLA can compete favorably with conventional thermoplastics such as polypropylene and polyethylene in the sectors such as packaging, automobiles, household, medical and agriculture. The substance and advantages of the present invention will become increasingly apparent by reference to the drawings and the description.

DESCRIPTION OF THE PREFERRED EMBODIMENTS

Example 1

Polyhydroxyalkonoates

In this embodiment, commercially available PHB (BIOMER P226) and poly(3-hydroxy butyrate-co-3-hydroxyvalerate), PHBV, trade name BIOPOL™ (Zeneca Bio Products) obtained from BIOMER, Germany and The hyperbranched polyester (HBP), a dendritic polymer having trade name BOLTORN®H2004, mol. Wt. 3200 g/mol., obtained from Perstorp, Sweden were used. BOLTORN®H2004 has 6 primary hydroxyl groups. This HBP has hydroxyl value of 110-135 mgKOH/g and maximum acid number of 7 mgKOH/g. Both PHB and PHBV were dried for 3 hrs at 80 C. in vacuum oven. The blends were prepared by melt mixing in a microcompounder (DSM Research, Netherlands). The instrument is a co-rotating twin-screw microcompounder having screw length of 150 mm, L/D of 18 and barrel volume of 15 cm³. The molten material was transferred from mini-extruder to a preheated small injection molder for fabrication of test specimens. The processing temperature was 175 C. and cycle time was 2.5 minutes for PHB/HBP Blends while the processing temperature was 160 C. and cycle time was 2.5 minutes for PHBV/ HBP blends. The following wt/wt compositions were prepared.

I. PHB/HBP(100/0)
II. PHB/HBP(95/05)
III. PHB/HBP(90/10)
IV. PHBV/HBP(100/0)
V. PHBV/HBP(95/05)

TABLE 1

Mechanical properties of HBP modified PHB and PHBV

| S. No. | Sample Description | Tensile Strength (MPa) | Modulus (GPa) | Notched Impact Strength (J/m) | Elongation at break (%) |
|---|---|---|---|---|---|
| 1. | PHB/HBP(100/0) | 29 ± 1.34 | 1.5 ± 0.6 | 51 ± 3.85 | 8 ± 1.8 |
| 2. | PHB/HBP(95/5) | 26 ± 0.23 | 1.3 ± 0.04 | 66 ± 4.5 | 10 ± 1.6 |
| 3. | PHB/HBP(90/10) | 24 ± 0.11 | 1.0 ± 0.1 | 77 ± 2.7 | 13 ± 3.4 |
| 4. | PHBV/HBP(100/0) | 27 ± 1.8 | 1.1 ± 0.08 | 46 ± 3.6 | 10 ± 0.13 |
| 5. | PHBV/HBP(95/5) | 24 ± 0.98 | 1.0 ± 0.02 | 49 ± 2.6 | 12 ± 0.26 |
| 6. | PHBV/HBP(90/10) | 22 ± 0.55 | 0.95 ± 0.008 | 73 ± 2.47 | 24 ± 2.06 |

VI. PHBV/HBP(90/10)

Here HBP stands for hyperbranched polymer which have trade name; BOLTORN® H2004. The FIG. 3 describes the crossection of microcompounder used in for preparation of HBP modified PHB and PHBV by melt mixing technique. The tensile test specimens were fabricated through extrusion followed by injection molding. The specimens were tested with help of United Calibration Corp SFM 20 testing machine as par ASTM D638. The tensile test coupons were tested at the crosshead speed of 2.0 inch/minute. The notched izod impact strength was measured with Inc. (TMI) 43-02-01 Monitor/Impact machine according to ASTM D256. The impact energy of the pendulum was 1 ft-lb.

The properties of above formulations are depicted in Table 1.

A reasonable increase in impact strength and % elongation for both PHB and PHBV was obtained. The impact strength of PHB was improved by 15% at 5 wt % of HBP and by 50% at 10 wt % of HBP and % Elongation of PHB was improved by more than 50% at 10 wt % of HBP. There was decrease in both tensile strength and modulus by around 20%. In case of PHBV, at 10 wt % of HBP, the impact strength was improved by ~58% and % elongation improved by more than 100%. Tensile strength and modulus of PHBV was decreased by 20% and 15% respectively.

Example 2

Polyhydroxyalkonoates

In this embodiment, unplasticized PHB (obtained from Biomer, Germany), which was in the form of powder, was melt blended with hyperbranched polymer (BOLTORN H2004) varying from 4 to 12 wt %. PHB was dried for 3 hrs at 80 C. in vacuum oven. Hyperbranched polymer (HBP) was also dried for 5 hrs at 60 C. in vacuum oven. The premixing of PHB powder and HBP was carried in a kitchen mixer for ~30 minutes. The mixed powder was kept overnight in zip-lock bags. The mixture was again dried for 3 hrs at 80 C. in vacuum oven before processing. The processing was carried out in a microcompounder (DSM Research, Netherlands). The processing temperature was 178 C., screw rotation was 100 rpm and cycle time was 3 minutes for all materials. The following wt/wt compositions were prepared.

I. PHB powder/HBP (100/0)
II. PHB powder/HBP (96/4)
III. PHB powder/HBP (92/8)
IV. PHB powder/HBP (88/12)

The tensile test specimens were fabricated through extrusion followed by injection molding. The specimens were tested with help of United Calibration Corp SFM 20 testing machine as par ASTM D638. The crosshead speed was 2.0 inch/minute during testing.

TABLE 2

Mechanical properties of HBP modified PHB

| Material Type | Tensile Strength (MPa) | Tensile Modulus (GPa) | Elongation at break (%) |
|---|---|---|---|
| PHB Powder/HBP(100/0) | 32 ± 4.5 | 2.76 ± 0.7 | 1.43 ± 0.44 |
| PHB Powder/HBP(96/04) | 30.0 ± 1.7 | 2.41 ± 0.24 | 1.74 ± 0.30 |
| PHB Powder/HBP(92/08) | 30 ± 1.7 | 2.23 ± 0.18 | 7.83 ± 0.78 |

The properties obtained are depicted in Table 2.

There was a good improvement in elongation at break value of PHB with addition of hyperbranched polymer (HBP). The elongation at break (%) of PHB was improved from 1.4 to 41.5% with addition of 12 wt % of hyperbranched polymer. The HBP modified PHB maintained a reasonable good value of tensile strength and modulus. This composition does not contain any plasticizer.

Example 3

Polyhydroxyalkonoates

In this embodiment, Talc (trade name silverline 002, obtained from Luzenac America, USA.) was incorporated in PHBV (BIOPOL™) in the presence of hyperbranched polymer (BOLTORN H2004). The following compositions were made by extrusion followed by injection molding using a microcompounder instrument.

I. PHBV/Talc(100/0)
II. PHBV/Talc(80/20)
III. PHBV(10% HBP)/Talc(80/20)

PHBV was dried for 3 hrs at 80 C. in vacuum oven. Talc particles were mixed with neat PHBV as well as in presence of hyperbranched polymer via a microcompounder (DSM Research, Netherlands). The processing temperature was 160 C. and cycle time was 4 minutes for talc filled PHBV composites, while it

TABLE 3

Elongation at break and impact strength of talc filled PHBV composites

| Material Type | Elongation at Break (%) | Izod Impact strength (J/m) |
|---|---|---|
| PHBV/Talc(100/0) | 10 ± 0.1 | 46 ± 3.6 |
| PHBV/Talc(80/20) | 4 ± 2.7 | 35 ± 1.8 |
| PHBV(10% HBP)/Talc(80/20 | 13 ± 2.7 | 52 ± 5.6 | was 2.5 minutes for neat PHBV. The tensile test specimens were fabricated through extrusion followed by injection molding. The specimens were tested with help of United Calibration Corp SFM 20 testing machine as par ASTM D638. The crosshead speed was 2.0 inch/minute during testing. The notched izod impact strength was measured with Inc. (TMI) 43-02-01 Monitor/Impact machine according to ASTM D256. The impact energy of the pendulum was 1 ft-lb.

The properties of above example are shown in Table 3.

The talc is common filler in plastics to improve its properties and cost reduction. The better dispersion of talc particles in polymer matrix is a major problem. The agglomeration of talc particles cause in reduction of tensile and impact properties drastically. The uniqueness of hyperbranched polymers is exploited both in matrix modifications and dispersion of talc particles in PHBV based composites. The impact strength and elongation at break values of talc filled PHBV in presence of hyperbranched polymer were superior to talc filled PHBV as well as neat PHBV. Other benefit of talc incorporation was that it reduces the amount of PHBV and HBP in overall composition.

Example 4

Polyhydroxyalkonoates

In this embodiment, an organically modified clay (Closite 25A obtained from Southern Clay Products) was incorporated in the PHB matrix in the presence of hyperbranched polymer (BOLTORN H2004). The objective of this experiment was to investigate the effect of nanoparticles on the properties of PHB in the

TABLE 4

Tensile properties of HBP modified PHB based nanocomposite

| Material Type | Tensile Strength (MPa) | Tensile Modulus (GPa) | Elongation at break (%) |
| --- | --- | --- | --- |
| Neat PHB | 32 ± 4.5 | 2.76 ± 0.71 | 1.4 ± 0.44 |
| PHB(12% HBP)98%/ Organo-Clay 2% | 30 ± 0.96 | 1.93 ± 0.16 | 5.6 ± 1.0 | presence of hyperbranched polymer. The premixed composition of PHB/HBP (88/12)(as per example 2) was mixed with 2 wt % of specific organo-clay in a microcompounder. This composition also contains 0.2 wt % of an antioxident (Ciba® IRGANOX® 1010FF) The processing cycle time was 3 minutes and the processing temperature was 176 C.

The specimens were tested with help of United Calibration Corp SFM 20 testing machine as par ASTM D638. The tensile test coupons were tested at the crosshead speed of 0.5 inch/minute.

The properties of HBP modified PHB based nanocomposite is given in table 4.

The composition of HBP modified PHB based composite showed better elongation property than neat PHB.

The optimized HBP modified PHAs blends can be reinforced by nanoparticles (such as clay and other nanofillers) followed by natural fiber reinforcement, which are referred to as nano biocomposites. The nano particles can improve the crystallization behavior of HBP modified PHB and PHBV. They can further improve the modulus and barrier of the blend. This type of composition can have application in field of rigid and flexible packaging. The nano-reinforced blends can be fiber reinforced to obtain a synergistic effect of both reinforcements. These types of materials have application in rigid packaging, automobiles and construction.

Besides extruded and injection molded materials, cast and blown films can be made from hyperbranched polymer modified PHAs and from their nanocomposites.

High impact PHB and PHBV based materials were successfully prepared. Hyperbranced polymer especially hyperbranched polyester (HBP) have been identified as impact modifier for brittle PHB and PHBV. It has high thermal stability (Decomposition temp. 300° C.), which is an important parameter for processing. HBP has effectively improved the toughness of both PHB and PHBV. The impact strength of PHB and PHBV was improved by ~50% by incorporating only 10 wt % of HBP. The other significant finding was that it did not have large diminishing effect on tensile strength and modulus of HBP modified PHB and PHBV.

Polylactic Acids

This invention provides a novel method for improving the elongation at break of PLA without having a drastic decrease in its tensile strength and modulus. Hyperbranched polyesters (HBP), which come under the category of dendritic polymers have been identified as a modifier for PLA properties. Hyperbranched polyester is hydroxyl functional aliphatic polyester, having a tree like structure in which a polyalcohol is a core from which other multifunctional compounds as repeating units extends. This forms a core-shell structure having a large number of hydroxyl groups at the periphery (Hyperbranched polymers—Unique Design tools for multi property control in resins and coatings, Bo Pettersson, Perstorp Polyols previously cited.). They can be made in different generations depending on the stoichiometry of the chain extender. Their uniqueness lies in their high reactivity, thermal stability, and low melt viscosity.

In Situ Modification of Hyperbranched Polymers (HBP) in PLA Matix.

In a unique and novel approach to modify Polylactides, the hyperbranched polymer is cross linked with an anhydydride functional compound (polyanhydride (PA) in this case) in the PLA matrix. Hyperbranched polymers have core-shell structure having dimensions at nanometer scale. This led to their high surface reactivity. But hyperbranched polymers don't entangle and have poor mechanical properties. Partially crosslinking of HBP with a polyanhydride is carried out in a way that it can have dimensions at nanometer scale, branched structure and, enough surface functionality. The crosslinked HBP can be termed as a nanogel. The selection of a specific commercially available hyperbranched polymer (FIG. 4A) was based on its molecular weight, number of hydroxyl groups (—OH) group per molecule of HBP and its glass transition temperature (Tg). In the current invention a commercially available polyanhydride (PA) (FIG. 4B)is used. The —OH groups of HBP react with the anhydride functionality of polyanhydride to form an ester linkage. A possible reaction mechanism is shown in FIG. 5. There can be two domains in anhydride modified hyperbranched polymers, one with high cross-link density and another with partially cross-linked section. The hyperbranched polymers were tailored in a way that they have only limited cross-linking. The benefit of using polyanhydride is that it reacts with HBP at the processing temperature of PLA. It avoids the addition of any catalyst or solvent thus making this process economical and environmentally friendly. The cross-linked HBP can have flowability at higher temperature. So the resultant PLA based composition will have trapped entanglement of crosslinked HBP. The trapped crosslinked HBP particles not only influence the crystallinity of PLA but will also improves the toughness of PLA by the mechanism similar to core-shell impact modifiers.

Advantages of this invention are:
1. Hyperbranched polyesters (HBPs) are aliphatic in nature and have low molecular weight. The HBP modified PLA can be completely biodegradable in nature.
2. HBPs have high thermal stability, a major advantage over most of the known plasticizers.
3. HBPs are highly reactive and effective even at low concentration.
4. HBP have higher functionality, so their properties can be tailored to achieve desired results.
5. HBPs tend to lower the melt viscosity of polymer. This particular property is a key factor in the better dispersion and exfoliation of organo-clay and talc particles in PLA based compositions.
6. HBP can improve the dispersion of cellulosic natural fiber and their compatibility in PLA based biocomposites.

The modified PLA based blends can compete favorably with conventional thermoplastics such as polypropylene, and high impact polystyrene in the sectors such as packaging, automobiles, household, medical and agriculture.

Examples

Polylactic Acids

Material and Methods

Poly (lactic acid), PLA (BIOMER® L9000) was obtained from Biomer, Germany. The hyperbranched polymer (HBP), a dendritic polymer having the trade name BOLTORN®H2004, mol. Wt. ~3200 g/mol was obtained from Perstorp, Sweden. BOLTORN®H2004 has 6 primary hydroxyl groups. This HBP has hydroxyl value of 110-135 mgKOH/g and maximum acid number of 7 mgKOH/g. Polyanhydride, trade name PA-18 (LV) having average molecular weight ~22500 gm/mol was obtained from Chevron-Phillips, USA. The PA is a linear polyanhydride resin having 1:1 mole ratio of 1-octadecene and maleic anhydride. Organo-Clay (CLOISITE® 25A) was obtained from Southern Clay Products, Inc., USA. CLOISITE 25A is natural montmorillonite clay modified with a quaternary ammonium salt. Kenaf fiber (100%) was obtained from FlaxCraft, USA. Talc, trade name; Jet Fill 700 C. was procured from Luzenac America, USA.

Example 1

Polylactic Acids

This embodiment describes the methods of making and properties of toughened PLA by using in-situ anhydride modified Hyperbranched Polymer PLA was dried for 4 hours at 40 C. in vacuum oven. The blends were prepared by melt mixing in a microcompounder/micro-extruder (DSM Research, Netherlands) Initially PLA was melted in the microcompounder (FIG. 6). The hyperbranched polymer (HBP) was added in-situ followed by addition of appropriate amount of polyanhydride (PA-18). The processing temperature was 185 C. and cycle time was 5-10 minutes.

Tensile coupons were made with the help of mini-injection molder. The compositions were made in way that each formulation contains 90 wt % of PLA and 10-wt % of in-situ polyanhydride modified hyperbranched polymers. The various combinations of hyperbranched polymer (HBP) and polyanhydride (PA) were used for in-situ modification of HBP. One composition of PLA having 10 wt % of HBP was also made in the absence of anhydride.

1. HBP/PA (85/15)—anhydride to —OH molar ratio—1:1.38
2. HBP/PA (80/20)—anhydride to —OH molar ratio—1:1
3. HBP/PA (70/30)—anhydride to —OH molar ratio—1:0.5
4. HBP/PA (60/40)—anhydride to —OH molar ratio—1:0.36

10 wt % of each of the above compositions was in situ melt blended with 90 wt % of PLA in a microcompounder (DSM Research, Netherlands). One composition of PLA having 10 wt % of HBP was also made in the absence of anhydride.

The tensile test specimens were fabricated through extrusion followed by injection molding. The specimens were tested with help of United Calibration Corp SFM 20 testing machine as par ASTM D638. The tensile test coupons were tested at the crosshead speed of 2 inch/minute.

Properties of the above described PLA based formulations are shown in Table 5.

The properties of the PLA based compositions are depicted in Table 5. The % elongation of PLA was improved by ~700-1000% in each PLA based compositions having anhydride modified HBP. There was minimal decrease in both tensile

TABLE 5

Mechanical properties of virgin PLA V/s invented PLA based materials

| S. No. | Sample Description | Tensile Strength (MPa) | Tensile Modulus (GPa) | Elongation at break (%) |
|---|---|---|---|---|
| 1. | PLA | 71.44 ± 1.09 | 3.3 ± 0.7 | 2.7 ± 0.13 |
| 2. | 90 wt. % PLA + 10 wt % HBP | 53.6 ± 1.22 | 2.96 ± 0.157 | 2.54 ± 0.14 |
| 3. | 90 wt % PLA + 10 wt % HBP (15% PA) | 57.94 ± 0.84 | 3.12 ± 0.16 | 32.8 ± 7.8 |
| 4. | 90 wt % PLA + 10 wt % HBP(20% PA) | 51.85 ± 0.77 | 2.5 ± 0.10 | 32.4 ± 8.3 |
| 5. | 90 wt % PLA + 10 wt % HBP(30% PA | 58.4 ± 1.0 | 2.9 ± 0.1 | 24.6 ± 1.7 |
| 6. | 90 wt % PLA + 10 Wt % HBP (40% PA) | 50.31 ± 0.47 | 2.5 ± 0.08 | 30.75 ± 8.75 | strength and modulus of PLA with addition of 10-wt % of in-situ anhydride modified hyperbranched polymer (HBP). So the resultant PLA based material better balance of stiffness and toughness as compared to virgin PLA.

Example 2

Polylactic Acids

This embodiment describes the processing and properties of Nano-composites and talc filled composites from Toughened PLA.

In this example, we attempted to optimize the minimum requirement of modified HBP for the modification of PLA. The 8 wt % of mHBP was incorporated in the PLA matrix. The mHBP in this case have 2:1 OH to anhydride ratio. The

TABLE 6

Tensile properties of PLA based formulations

| S. No. | Material Type | Tensile Strength (MPa) | Tensile Modulus (GPa) | Elongation at break (%) |
|---|---|---|---|---|
| 1. | Neat PLA | 75.34 ± 1.08 | 3.46 ± 0.1 | 4.44 ± 1.47 |
| 2. | 92 wt. % PLA + 8 wt % mHBP | 59.08 ± 0.43 | 3.24 ± 0.14 | 36.79 ± 8.54 |
| 3. | 98 wt. % PLA(8% mHBP) + 2 wt % organo-clay | 58.18 ± 2.08 | 3.24 ± 0.13 | 83.24 ± 17.17 |

TABLE 6-continued

Tensile properties of PLA based formulations

| S. No. | Material Type | Tensile Strength (MPa) | Tensile Modulus (GPa) | Elongation at break (%) |
|---|---|---|---|---|
| 4. | 95 wt. % PLA(8% mHBP) + 5 wt % organo-clay | 55.11 ± 0.45 | 3.29 ± 0.17 | 35.85 ± 13.33 |
| 5. | 95 wt. % PLA(8% mHBP) + 5 wt % Talc | 54.67 ± 0.45 | 3.15 ± 0.4 | 103.68 ± 56.70 | processing is carried out in a microcompounder (DSM Research, Netherlands). The processing temperature was 185 C., cycle time was 10 minutes and screw speed was 100 rpm. We are going to use term PLA (8% mHBP) for this composition. This composition was considered as base resin for fabricating nano-composites and talc filled composites. The processing time was 185 C., the screw rotation was 150 rpm and cycle time was 5 minutes. The following formulations were made
1. Neat PLA 92 wt %/mHBP 8 wt % (Here OH to anhydride ratio was 2:1)
2. PLA (8% mHBP) 98 wt %/Clay 2 wt %
3. PLA (8% mHBP) 95 wt %/Clay 5 wt %
4. PLA (8% mHBP) 95 wt %/Talc 5 wt %

The specimens were tested with help of United Calibration Corp SFM 20 testing machine as par ASTM D638. The tensile test coupons were tested at the crosshead speed of 0.6 inch/minute.

The properties of above formulations are shown in table 6.

As presented in table 6, there was encouraging improvement in elongation property of PLA with incorporation of anhydride modified HBP, and from the combination of modified HBP with nanoclay and talc. There was around ~9 fold improvement in elongation at break of PLA when modified with HBP. The modified PLA based nanocomposite having clay (2 wt. %) showed ~20 fold increase in elongation at break as compared to neat PLA. The talc(5 wt %)filled composite of modified PLA showed ~25 fold improvement in elongation at break as compared to neat PLA. Surprisingly, there was negligible sacrifice in the modulus of PLA. The modified PLA also showed reasonably high tensile strength.

The significance of these results lies in the fact that a tough PLA based composition having good strength and modulus values can be fabricated by tailoring the architecture of hyperbranched polymer in PLA matrix. The benefits of nano and micro reinforcements in a polymer matrix can be magnified in the presence of anhydride modified HBP. These PLA based compositions can have application in both flexible and rigid packaging.

Example 3

Polylactic Acids

In this embodiment, 20 and 40 wt % of modified PLA (PLA (8% mHBP) was blended with neat PLA. These compositions contained more than 95 wt. % of polylactic acid (PLA). In another formulation, a 38 wt % of modified PLA (mPLA) (8% mHBP) and 2 wt % of nanoclay was incorporated in the neat PLA matrix. The following compositions (wt/wt) were made:

1. neatPLA/mPLA (80/20)
2. neatPLA/mPLA (60/40)
3. neatPLA/mPLA/clay (60/38/02)

The processing cycle time was 5 minutes, processing temperature was 185 C. and screw speed was 150 rpm.

The specimens were tested with help of United

TABLE 7

Tensile properties of neat PLA and modified PLA (mPLA) based formulations

| S. No. | Material Type | Tensile Strength (MPa) | Tensile Modulus (GPa) | Elongation at break (%) |
|---|---|---|---|---|
| 1. | Neat PLA | 75.34 ± 1.08 | 3.46 ± 0.1 | 4.44 ± 1.47 |
| 2. | Neat PLA/ mPLA(80/20) | 59.47 ± 0.97 | 3.11 ± 0.14 | 6.9 ± 1.13 |
| 3. | Neat PLA/ mPLA(60/40) | 59.07 ± 0.63 | 3.0 ± 0.14 | 7.5 ± 0.84 |
| 4. | Neat PLA/ mPLA/Clay (60/38/2) | 60.22 ± 0.65 | 3.0 ± 0.23 | 61.25 ± 19.64 |

Calibration Corp SFM 20 testing machine as par ASTM D638. The tensile test coupons were tested at the crosshead speed of 0.6 inch/minute.

The properties of above compositions are given in table 7.

Table 7 showed that there was small improvement in the elongation at break of neat PLA, when blended with 20 and 40 wt. % of modified PLA (PLA having 8% wt % of anhydride modified HBP). But the nanocomposite of PLA having 38%mPLA and 2 wt. % clay showed an encouraging improvement in the elongation at break of PLA.

The significance of these compositions is that modified PLA can be used as a master batch to modify the PLA property. In PLA based nanocomposite, mPLA can be used for better dispersion of nano-particle due to the presence of crosslinked HBP particles in PLA domain, which reduce the melt viscosity and will cause better wetting of nano-particles. This method also has commercial viability, as once modified PLA is fabricated by an internal mixer as used in current invention. We can directly blend this mPLA with neat PLA in various continuous processes such as extrusion, injection molding, extrusion cast and blown film. This method also increases the PLA content in overall composition, making it less costly and sustainable. Talc filled PLA based composition can also be made from above method.

Example 4

Polylactic Acids

In this embodiment, polylactic acid (PLA) based cast film was successfully fabricated with the help of a mini cast film line attached with a micro-compounder (DSM Research, Netherlands). The following compositions based film were made
I. Neat PLA
II. PLA 90 wt %/HBP 10 wt %
III. PLA 90 wt %/mHBP 10 wt %: here mHBP-HBP having 15% PA
IV. PLA (10% mHBP)98 wt %/Clay 2 wt %

The Neat PLA and PLA 90 wt %/HBP 10 wt % are processed for 3 minutes at 185 C. while mHBP modified PLA and its nanocomposite were processed for 10 minutes at 185 C. in a microcompounder. The cast films were made by attaching a slit die at the opening of micro extruder. The extrudate was stretched with help of two mini-rollers. The present invention provides extrusion blown and cast films of the PLA based material.

Example 5

Polylactic Acids

In this embodiment biocomposites from PLA in the presence of Hyperbranched Polymer were made.

The processing was carried out in DSM microcompounder a single step. The processing temperature was 185 C. and processing time was 10 minutes. The kenaf fiber were chopped to the approximate length of 6-8 mm and dried for 16 hrs at 80 C. in vacuum oven. The following formulation was made.

1. Neat PLA 70 wt %/Kenaf 30 wt %
2. PLA (modified with 10% HBP) 70 wt %/Kenaf 30 wt %

The specimens were tested with help of United Calibration Corp SFM 20 testing machine as par ASTM D638. The tensile test coupons were tested at the crosshead speed of 0.1 inch/minute.

The properties of PLA based biocomposite are shown in table 8.

TABLE 8

Tensile properties of PLA based biocomposites

| S. No. | Material Type | Tensile Strength (MPa) | Tensile Modulus (GPa) | Elongation at break (%) |
|---|---|---|---|---|
| 1. | Neat PLA | 71.44 ± 1.09 | 3.3 ± 0.7 | 2.7 ± 0.13 |
| 2. | 70 wt. % PLA + 30 wt % kenaf fiber | 54.13 ± 0.69 | 5.4 ± 0.129 | 1.55 ± 0.177 |
| 3. | 70 wt. % PLA(10% HBP) + 30 wt % kenaf fiber | 46.50 ± 0.66 | 4.5 ± 0.09 | 2.31 ± 0.52 |

The main objective of this experiment was to obtain superior melt processing conditions for PLA based biocomposite for better dispersion and wettability of kenaf fiber. Table 8 represents the tensile properties of PLA based composites with and without the presence of hyperbranched polymers. A drop in tensile strength and modulus of PLA based composites was observed in presence of HBP as compared to neat PLA based composite, but HBP modified PLA based composite showed similar elongation at break when compared to unreinforced PLA.

Example 6

Polylactic Acids

In this embodiment, nano-biocomposites of PLA modified with hyperbranched polymers (HBP) were fabricated. The nano-biocomposite is defined as a PLA based composition having organo-clay as well as natural fibers. The processing was carried out in DSM microcompounder (DSM Research, Netherlands) in single step. The processing temperature was 185 C. and processing time was 10 minutes. The following formulation was made.

1. Neat PLA 68 wt %/Clay 2 wt %/Kenaf 30 wt %
2. PLA (10% HBP) 68 wt %/Clay 2 wt %/Kenaf 30 wt %
3. PLA (10% mHBP) 68 wt %/Clay 2 wt %/Kenaf 30 wt %

The specimens were tested with help of United Calibration Corp SFM 20 testing machine as par ASTM D638. The tensile test coupons were tested at the crosshead speed of 0.1 inch/minute.

The property of PLA based nano-biocomposite is shown in table 9.

TABLE 9

Tensile properties of PLA based nanobiocomposites

| S. No. | Sample Description | Tensile Strength (MPa) | Modulus (GPa) | Elongation at break (%) |
|---|---|---|---|---|
| 1. | PLA | 71.44 ± 1.09 | 3.3 ± 0.7 | 2.7 ± 0.13 |
| 2. | 68 wt. % PLA + 2 wt % Organo-clay + 30 wt % kenaf fiber | 52.9 ± 0.70 | 4.9 ± 0.5 | 1.33 ± 0.87 |
| 3. | 68 wt. % PLA(10% HBP) + 2 wt % organo-clay + 30 wt % kenaf fiber | 37.36 ± 0.6 | 3.79 ± 0.25 | 3.184 ± 0.48 |
| 4. | 68 wt. % PLA (10% mHBP) + 2 wt % organo-clay + 30 wt % kenaf | 32.98 ± 1.46 | 3.8 ± 0.5 | 2.07 ± 0.61 |

The PLA based nano-biocomposites were formulated with and without the presence of hyperbranched polymer. The objective here was to fabricate high performance PLA based materials by synergistic effect of nanoparticles and natural fiber. The tensile properties of PLA based nano-biocomposites are shown in Table 9.

The composition of HBP and PA in PLA can be further optimized to improve the % elongation of PLA for film application and better gas barrier properties. Toughened PLA based cast film was fabricated. The extrusion blown film can be made with the PLA based formulations. Nanoclay and talc reinforced PLA based films as well as their combinations can be fabricated. The developed films will find a place in flexible packaging.

Low heat distortion temperature (HDT) is a major problem of PLA. PLA can be blended with poly(hydroxyl butyrate) (PHB) in presence of hyperbranched polymer to improve its HDT. PHB is known to have a high HDT value.

In effort to improve the properties PLA/HBP blends, the end hydroxyl groups of various HBP can be modified by reacting them with long chain fatty acid such as palmitic acid, oleic acid, stearic acid, and the like.

In summary the modified PLA base material can be reinforced with organo-clay, talc and natural fibers. The nanocomposite and talc filled composites of modified PLA based material has improved mechanical and barrier properties. The compositions have application in flexible packaging. The talc filled modified PLA based material is cheaper in cost with improved thermo-mechanical properties. The natural fiber reinforced modified PLA based composites can have high thermo-mechanical properties. Such compositions are expected to find application in rigid packaging, distribution packaging, automotives and structural applications. The nano particles and talc filled modified PLA based materials can be further reinforced with natural fibers to develop hybrid composites, which have the benefit of both reinforcements resulting in superior thermo-mechanical properties.

Toughened PLA based materials were successfully prepared. Polyanhydride modified hyperbranched polyester (HBP) has been identified as toughening agent for brittle PLA. The elongation at break of PLA was improved by ~700-1000% in each PLA based compositions having anhydride modified HBP. There was minimal decrease in both tensile strength and modulus of PLA with addition of 10 wt % of in situ anhydride modified hyperbranched polymer (HBP). So the resultant PLA based compositions were both strong and tough as compared to virgin PLA. The modified PLA based nanocomposites and talc filled composites showed remarkable improvement in the elongation at break of PLA. One of the talc filled modified PLA based formulation showed more than a 25-fold improvement in elongation at break as compared to virgin PLA. Modified PLA based biocomposites and nano-biocomposites were also fabricated. The PLA based materials are expected to find a place in flexible, rigid packaging as well as in structural applications.

Polyanhydride modified HBP can be used for modification of polyhydroxyalkanoates (PHAs) such as poly (3-hydroxy butyrate), PHB and poly (3-hydroxybutyrate-co-3-hydroxy-valerate), PHBV. The modified PHB and PHBV can be used for nano-reinforcement, talc filling, natural fiber reinforcement and hybrid composites from combination of these reinforcements.

It is intended that the foregoing description be only illustrative of the present invention and that the present invention be limited only by the herein after appended claims.

We claim:

1. A composition comprising an extrusion blended mixture of:
   (a) a thermoplastic biodegradable polyester polymer of a lactic acid monomer;
   (b) a hyperbranched dendritic polymer comprising a hydroxyl functional group; and
   (c) an anhydride;
   wherein:
      (i) the anhydride and the hyperbranched dendritic polymer form a reaction product as an anhydride modified hyperbranched dendritic polymer comprising an ester linkage between the anhydride and the hydroxyl group of the hyperbranched dendritic polymer; and
      (ii) the anhydride modified hyperbranched dendritic polymer improves elongation at break of the biodegradable polyester polymer at least about 700% relative to the biodegradable polyester polymer alone.

2. The composition of claim 1 wherein the anhydride modified hyperbranched dendritic polymer is present in an amount between about 2 and 12% by weight of the composition.

3. The composition of claim 1 wherein the hyperbranched dendrite polymer is a hyperbranched polyester dendrite polymer.

4. The composition of claim 1 wherein the biodegradable polyester polymer further comprises a polyhydroxyalkanoate (PHA) selected from the group consisting of poly(hydroxybutyrate) (PHB), poly (hydroxybutyrate-co-valerate) (PHBV) and mixtures thereof.

5. The composition of claim 1 further comprising clay particles, talc particles and mixtures thereof.

6. The composition of claim 5, wherein the anhydride modified hyperbranched dendritic polymer is a matrix modifier as well as dispersing agent for clay and talc particles.

7. The composition of claim 1 with en improved heat deflection temperature over the biodegradable polyester polymer alone.

8. The composition of claim 1 with an improved heat deflection temperature over the biodegradable polyester polymer alone and wherein the biodegradable polyester polymer further comprises a polyhydroxyalkanoate (PHA) selected from the group consisting of poly (hydroxybutyrate) (PHB), poly (hydroxybutyrate-co-valerate) (PHBV) mixtures thereof.

9. The composition of claim 8 further comprising nanoclay particles, clay particles or mixtures thereof.

10. The composition of claim 9, wherein the anhydride modified hyperbranched dendritic polymer is a matrix modifier as well as compatibilizer for different biodegradable polyester polymers.

11. The composition of any one of claims 1, 8, or 9 as a cast or blown film.

12. A blend of neat polylactic acid with a modified polylactic acid according to the composition of claim 1 as a master batch, wherein the modified polylactic acid is present in the blend in an amount varying from 20 to 60 wt % and the blend optionally contains clay particles varying from 2 to 5 wt % and talc particles varying from 2 to 50 wt %.

13. A modified polylactic acid composition comprising an extrusion blended mixture of:
   (a) a thermoplastic biodegradable polyester polymer comprising polylactic acid;
   (b) an anhydride modified hyperbranched dendritic polymer in an amount ranging from about 2 wt. % to 12 wt. % of the composition, wherein the anhydride modified hyperbranched dendritic polymer comprises an ester reaction product between an anhydride and a hyperbranched dendritic polymer having hydroxyl functionality; and
   (c) optionally, clay particles or talc particles to provide improved gas barrier properties.

14. The composition of claim 1 further comprising a natural fiber.

15. The composition of claim 14, wherein the hyperbranched dendritic polymer or the anhydride modified hyperbranched dendritic polymer is matrix modifier as well as a compatibilizer for the natural fiber.

16. The composition of claim 1 wherein the biodegradable polyester polymer comprises a blend of polylactic acid and polyhydroxyalkanoate.

17. A process for preparing the composition of claim 1 which comprises reactively extruding the hyperbranched dendritic polymer with the biodegradable polyester polymer at an extruder barrel temperature below a decomposition temperature of the biodegradable polyester polymer.

18. A process for preparing the composition of claim 1 which comprises reactively extruding the hyperbranched dendritic polymer with the biodegradable polyester polymer at an extruder barrel temperature below the decomposition temperature of the biodegradable polyester polymer and wherein the extruder has single or duel rotating screws for blending.

19. The composition of claim 1 wherein the anhydride is a polyanhydride (PA) present between about 5-50% by weight with respect to the anhydride modified hyperbranched dendritic polymer.

20. The composition of claims 1 or 13 wherein the anhydride modified hyperbranched dendritic polymer is at least partially crosslinked.

21. The composition of claim 20 wherein the anhydride comprises a polymeric polyanhydride that forms crosslinks in the anhydride modified hyperbranched dendritic polymer.

22. The composition of claims 1 or 13 wherein the anhydride comprises a polymeric polyanhydride.

23. The composition of claim 13 wherein the hyperbranched dendritic polymer comprises a hyperbranched dendritic polyester polymer.

24. The composition of claim 13 further comprising a polyhydroxyalkanoate.

25. The composition of claim 24 wherein the polyhydroxyalkanoate is selected from the group consisting of poly(hydroxybutyrate) (PHB), poly(hydroxybutyrate-co-valerate) (PHBV), and mixtures thereof.

* * * * *

UNITED STATES PATENT AND TRADEMARK OFFICE
CERTIFICATE OF CORRECTION

PATENT NO. : 7,579,413 B2
APPLICATION NO. : 11/414716
DATED : August 25, 2009
INVENTOR(S) : Mohanty et al.

It is certified that error appears in the above-identified patent and that said Letters Patent is hereby corrected as shown below:

Column 4, line 36, "was -4nm" should be --was ~4nm--.

Column 18, line 4, Claim 7, "with en improved" should be --with an improved--.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,579,413 B2 | Page 1 of 1 |
| APPLICATION NO. | : 11/414716 | |
| DATED | : August 25, 2009 | |
| INVENTOR(S) | : Amar K. Mohanty and Rahul Bhardwaj | |

It is certified that error appears in the above-identified patent and that said Letters Patent is hereby corrected as shown below:

In the Specification

In column 1, line 22, please delete:

"Not Applicable"

and insert:

-- This invention was made with government support under DMI0400296 awarded by the National Science Foundation. The government has certain rights in the invention. --

Signed and Sealed this
Twenty-fifth Day of February, 2014

Michelle K. Lee
*Deputy Director of the United States Patent and Trademark Office*